J. W. BRYCE.
TIME CIRCUIT CONTROLLER.
APPLICATION FILED SEPT. 25, 1917.
1,279,647.
Patented Sept. 24, 1918.
3 SHEETS—SHEET 1.
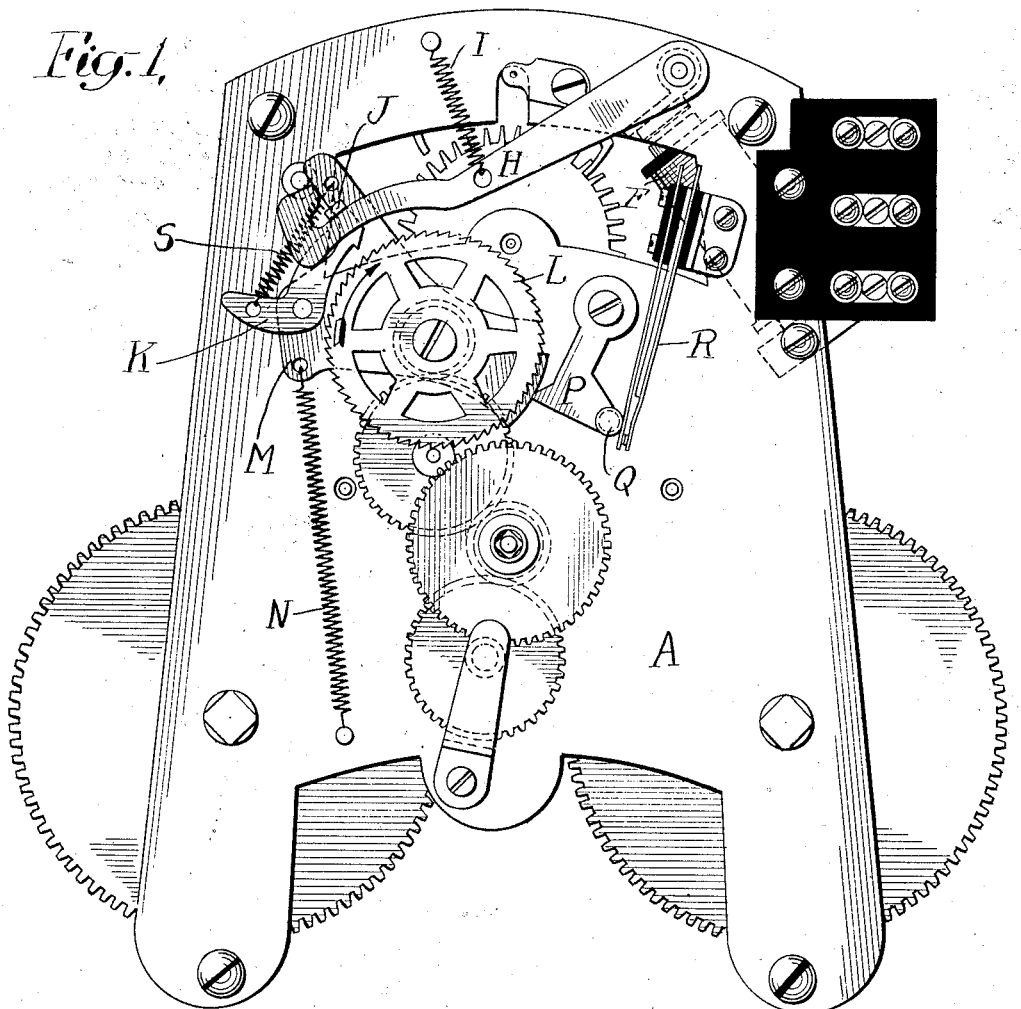
INVENTOR
James W. Bryce
BY
ATTORNEYS J. W. BRYCE.
TIME CIRCUIT CONTROLLER.
APPLICATION FILED SEPT. 25, 1917.
1,279,647.
Patented Sept. 24, 1918.
3 SHEETS—SHEET 2.
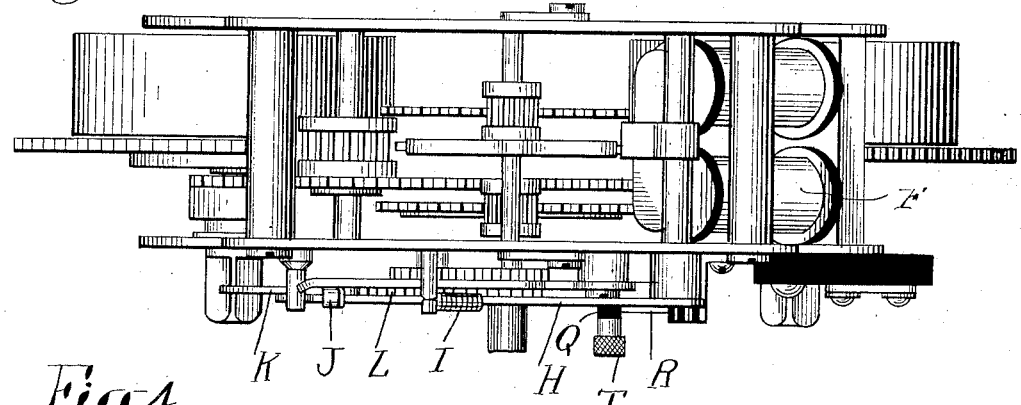
Fig. 3.
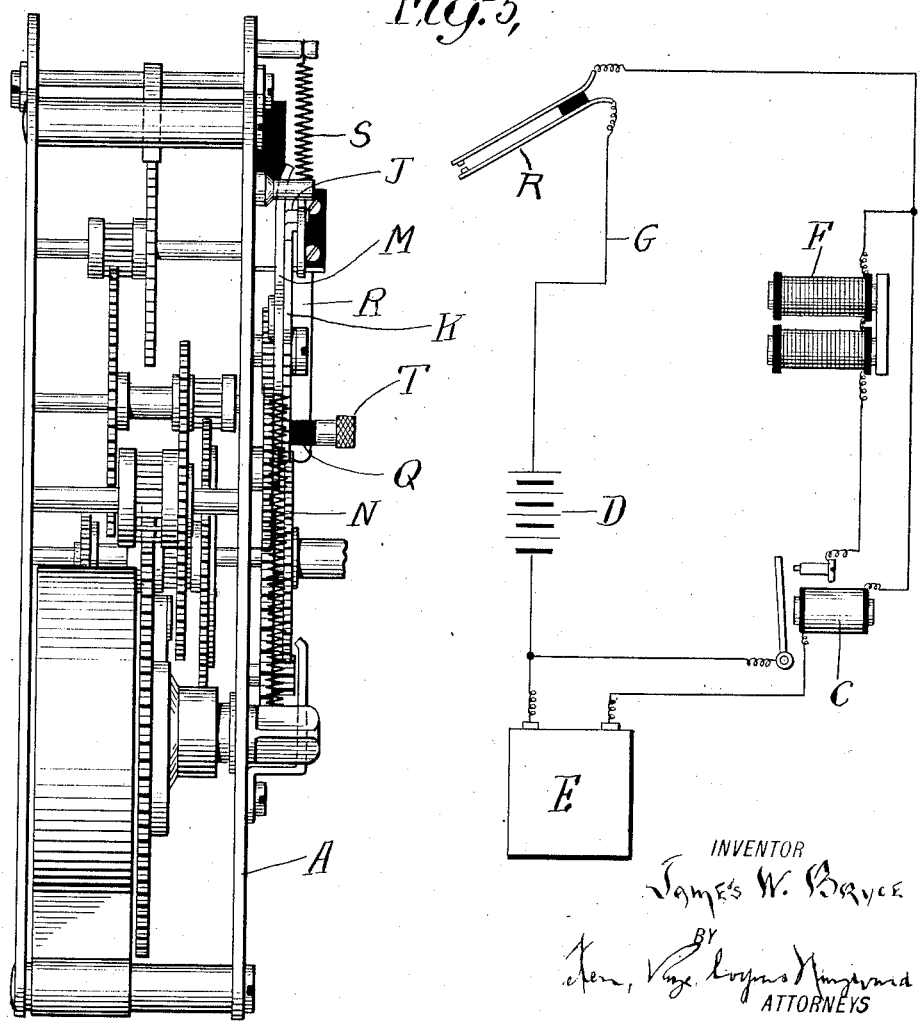
Fig. 4.
Fig. 5.
INVENTOR
James W. Bryce
BY
ATTORNEYS

J. W. BRYCE.
TIME CIRCUIT CONTROLLER.
APPLICATION FILED SEPT. 25, 1917.

1,279,647.

Patented Sept. 24, 1918.
3 SHEETS—SHEET 3.

INVENTOR
James W. Bryce
BY
*[signature]*
ATTORNEYS

UNITED STATES PATENT OFFICE.

JAMES W. BRYCE, OF BLOOMFIELD, NEW JERSEY, ASSIGNOR TO INTERNATIONAL TIME RECORDING COMPANY OF NEW YORK, OF ENDICOTT, NEW YORK, A CORPORATION OF NEW YORK.

TIME CIRCUIT-CONTROLLER.

1,279,647.

Specification of Letters Patent.

Patented Sept. 24, 1918.

Application filed September 25, 1917. Serial No. 193,060.

*To all whom it may concern:*

Be it known that I, JAMES W. BRYCE, a citizen of the United States, residing at Bloomfield, in the county of Essex and State of New Jersey, have invented certain new and useful Improvements in Time Circuit-Controllers, of which the following is a full, clear, and exact description.

In many systems of electrical control, such for example as time recording or recording lock systems, a source of current such as a primary or storage battery is used, that for the operation of the electrically controlled devices is periodically drawn upon for brief intervals for small amounts of current energy. It not infrequently happens in such cases that either by improper manipulation of the current controlling devices, or by some disarrangement of the system due to accident, that the battery circuit is closed for more or less protracted periods, with the result that there is an undue waste of energy and the battery is exhausted before the leakage or waste is brought to the attention of those in charge.

This invention has primarily for its object to release the interlock circuits of recording lock devices so that in case of trouble the owner can enter or leave the premises, and also to prevent such occurrences as above described, or at least to direct attention to any conditions of derangement that may exist for periods beyond those necessary for the proper use of the system, so that the source of trouble may be located and corrected before any substantial waste of energy can occur.

In carrying out my invention I provide for the periodical discharge of battery current over its circuit which the proper operation of the devices therein calls for, no substantial change in the means employed from such as have heretofore been used being made or desired, but in addition I employ means which operate to interrupt the circuit and prevent any drain on the battery whenever the current has flowed for a predetermined period safely in excess of those required for normal operation.

The invention necessarily involves a consideration of the specific means employed for this purpose, and these I have illustrated in the accompanying drawings in which—

Figure 1 is a view in elevation of a recorder clock controlling mechanism with my improved device attached thereto.

Fig. 2 is a view in elevation of the clock dial.

Fig. 3 is a top plan view of the device of Fig. 1.

Fig 4 is a side elevation of the same.

Fig. 5 is a diagram illustrating the mode of operation of the apparatus.

Figure 6:
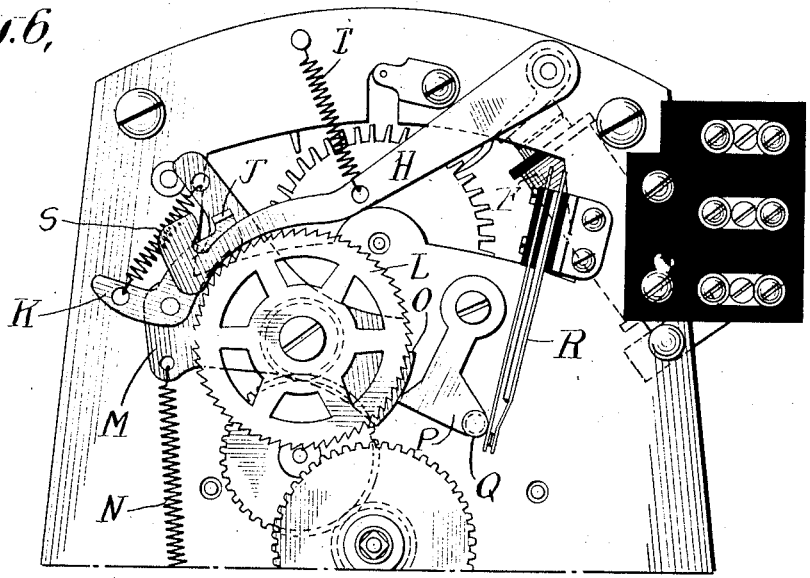
Figs. 6 and 7 are detail views, in elevation illustrating the attachment and its mode of operation.

A represents any controlling clock mechanism of which the time indicating dial B is shown detached in Fig. 2. The functions of this device are to drive a recorder operated by the controlled mechanisms of whatever nature they may be, and in construction and operation in this regard it differs in no essential respect from others well known in the art.

It may be assumed for purposes of illustration that the circuit controller C, Fig. 5, is controlled by any device which takes current for its operation, or by any short circuit in the line and is periodically operated to close for brief intervals the working circuit G including a battery D, and to thereby control one or more devices in this circuit one of which is represented by E. This is the normal operation of the apparatus.

The clock mechanism contains an electromagnet F, however, which is energized whenever the line G is closed by the relay or circuit controller C, or by any other means accidental, or otherwise. This magnet controls and operates an armature lever H, and when energized draws it toward its poles.

Normally the lever H is retracted by a spring I, and in its retracted or normal position, by engagement with an ear J on a pivoted pawl K, holds such pawl in an inoperative position with reference to a toothed wheel L, driven at a slow rate of speed by the clock train.

The pawl K is pivoted to a plate M, mounted to revolve on the arbor of the wheel L against the tension of a light spring N secured to it and to the clock frame respectively. This plate M has an arcuate end with a notch O therein and upon its edge normally bears a lever P having at one side a stop Q that normally bears upon one of two contact springs R in the line circuit G, and maintains through these springs the integrity of such circuit.

Whenever the magnet F is energized the lever H is attracted and the pawl K under the influence of a retractile spring S is brought into engagement with the teeth of the continuously rotating wheel L. If the energization of the magnet F is but momentary the pawl is lifted by the lever H out of engagement with wheel L and no unusual action results, but if the action of the magnet is prolonged the movement of the wheel L in engagement with the pawl K draws around the plate M until the notch in its end comes under the lever P, whereupon this lever shifts its position and releasing the spring contacts R from engagement, breaks the battery circuit permanently.

Usually the parts are so designed that the shoulder of the cutaway part or notch O requires about five minutes from the moment of engagement of the pawl K with the wheel L to be brought to the position in which it releases the lever P. No closure of the line circuit of greater duration than five minutes can therefore at any time occur, and no greater period of wastage of energy can hence take place.

Should, for any reason, a closure of the circuit be caused, which lasts more than five minutes, the entire circuit is broken and rendered inoperative. This will be at once discovered, and the cause of closure may then be investigated and located, and when corrected the lever P may be retracted by hand, it being for this purpose provided with a pin T that extends through an opening in the clock dial B, whereupon the system will continue to work in a normal manner.

Figure 7:
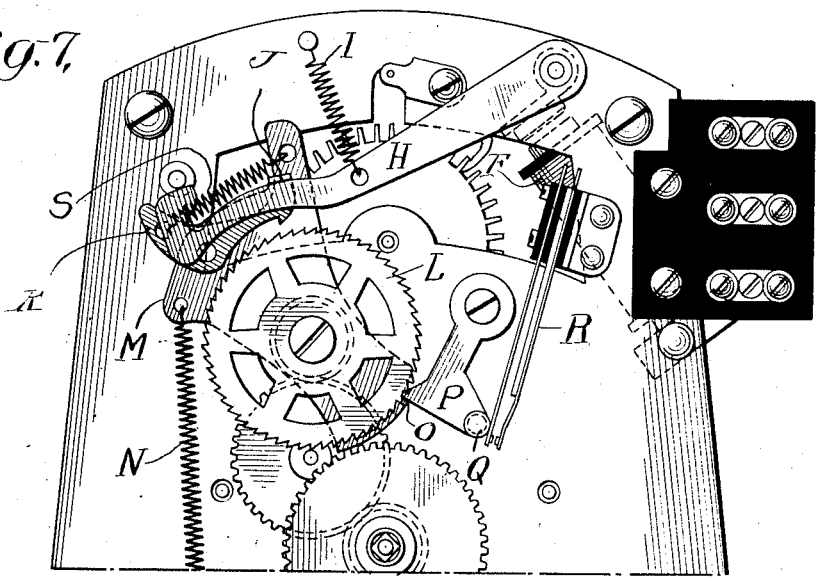

From the above description the illustrations of the several figures will be understood. For example, Fig. 6 shows the lever H attracted and the pawl in engagement with the wheel L. Fig. 7 shows the parts at the moment when the lever P as slipped over the shoulder of the notch and interrupted the circuit which results in the release of the pawl and the stoppage of the plate M until it is released by hand.

So far as I am informed, the improvement involves a new principle of operation in systems of this nature, so that the invention is not limited to the specific embodiment of that principle illustrated in the drawings.

What I therefore claim as my invention is:

1. In a system of the kind described, the combination with a working circuit and electrically controlled devices therein requiring for their operation currents of definite duration, of a timing circuit controller operated by the circuit and incapable of breaking the circuit while normal working conditions obtain therein, but adapted to permanently break such circuit after it has been in operation for a predetermined interval of time longer than normally required for the operation of the devices therein.

2. In a system of the kind described, the combination with a working circuit and electrically controlled devices therein requiring for their operation currents of definite duration, of a timing circuit closing device adapted to be started in operation and restored to normal condition by currents in the working circuit, and adapted to permanently break the working circuit only after it has been in operation, due to the starting action thereon of a line current impulse, for an interval of time longer than those normally required for the operation of the devices therein.

In testimony whereof I hereunto affix my signature.

JAMES W. BRYCE.